US006373849B1

(12) United States Patent
Noonan

(10) Patent No.: US 6,373,849 B1
(45) Date of Patent: Apr. 16, 2002

(54) RESOURCE INTERFACE UNIT FOR TELECOMMUNICATIONS SWITCHING NODE

(75) Inventor: Michael E. Noonan, Rochester, MA (US)

(73) Assignee: Excel Switching Corporation, Hyannis, MA (US)

( * ) Notice: Subject to any disclaimer, the term of this patent is extended or adjusted under 35 U.S.C. 154(b) by 0 days.

(21) Appl. No.: 09/093,583

(22) Filed: Jun. 8, 1998

(51) Int. Cl.[7] .............................................. H04L 12/66
(52) U.S. Cl. ....................... 370/408; 370/362; 370/463; 370/489
(58) Field of Search ................................ 370/396, 392, 370/389, 408, 463, 489, 362; 379/242, 201

(56) References Cited

U.S. PATENT DOCUMENTS

| | | | |
|---|---|---|---|
| 4,849,966 A | | 7/1989 | Willis et al. |
| 5,349,579 A | * | 9/1994 | Madonna .................... 370/58.2 |
| 5,390,241 A | * | 2/1995 | Nales .......................... 379/207 |
| 5,426,694 A | * | 6/1995 | Hebert ......................... 379/242 |
| 5,539,884 A | * | 7/1996 | Robrock ................. 395/200.12 |
| 5,544,163 A | * | 8/1996 | Madonna .................... 370/60.1 |
| 5,546,453 A | * | 8/1996 | Hebert ......................... 379/242 |
| 5,581,553 A | | 12/1996 | Cave et al. |
| 6,058,181 A | * | 5/2000 | Hebert ......................... 379/242 |

OTHER PUBLICATIONS

Excel Switching Corporation, *"Excel Resource Bus Interface,"* Marketing Brochure, pp. 1–4 (1996).
Excel Switching Corporation, *"Excel Expandable Switching System,"* Marketing Brochure, pp. 1–2, (1996).

* cited by examiner

*Primary Examiner*—Hassan Kizou
*Assistant Examiner*—Roberta Stevens
(74) *Attorney, Agent, or Firm*—Cesari and McKenna, LLP

(57) ABSTRACT

A telecommunications switching node that includes at least one resource interface card which serves as an interface for connection to external call processing resources. The interface card communicates with the line cards in the switching node directly over the system buses, i.e. without passing through the CPU\matrix card and it uses two line card ports to connect to all external resources. The resource interface card also communicates with line cards that are connected to the system buses in other switching nodes in an expanded switching network. Its resources are thus available to ports in the other nodes when those nodes have available ports that are not occupied with other tasks. For communications with the latter ports, the resource interface card transmits information through the CPU/matrix cards on its switching node and on the nodes where the communicating ports reside. Thus for communications with ports on its switching node, the interface card receives information on the incoming bus and transmits it on the outgoing bus and for communications with ports on other nodes it receives information on the outgoing bus and transmits it on the incoming bus.

16 Claims, 5 Drawing Sheets

RESOURCE INTERFACE UNIT FOR TELECOMMUNICATIONS SWITCHING NODE

TECHNICAL FIELD

This invention relates generally to the field of telecommunications switching systems and more particularly to a telecommunications switch that includes resource interface cards for connections, without a loss of network connectivity, to external resources which may provide call processing services.

BACKGROUND OF THE INVENTION

An example of a switching system to which the present invention applies is described in U.S. Pat. No. 5,544,163, Expandable Telecommunications System, the contents of which are incorporated by reference herein. A telecommunication switching node described therein has line cards with multiple ports connected to subscriber's telephone lines or to other devices such as PSTN trunks. The switch also includes a CPU/matrix card and at least two system buses for switching calls received on one port to another port in the system. One of these buses is an incoming bus that passes messages from the line cards to the matrix card and the other is an outgoing bus which transmits messages from the matrix card to the line cards. In order to perform switching on calls, the switch receives information from and transmits information to line card ports over the system buses at predetermined times known as time slots. Each time slot generally corresponds with a port on the switch.

Each call involves connection between two ports. Because communication between these ports is bidirectional, it thus requires four time slots on the system buses. One time slot is used for transmission from one port to the matrix card, a second time slot is used for retrieving information from matrix card and sending it to the other port; the other two time slots are used for transmissions in the other direction. The switch stores information received in time slots in the incoming bus in corresponding memory locations. Thereafter, the switch retrieves the information from memory and transmits it over outgoing time slots assigned to the ports that are to receive the information.

In addition to call switching, the switch is also required to provide call processing services including, inter alia, tone generation and detection and voice mail. These services are provided by cards that are connected to the system buses to communicate with the line card ports to which the services are to be provided. A prior system as described in U.S. Pat. No. 5,349,579, Telecommunications Switch with Programmable Communications Services, includes programmable service cards that transmit information directly to the line cards over the outgoing bus, i.e., without passing through the CPU\matrix card. Similarly, they receive information from the line cards directly over the incoming bus. Thus only two time slots are needed in these communications as compared with the four time slots that would be used if the information passed through the CPU/matrix card. This reduces the number of time slots required for communications between the ports and the desired call processing services on the services card, thus minimizing the reduction in the call-handling capacity of the switch. The communications services cards described therein service only resources that are internal to the switch, i.e. on cards connected to the switch buses. In order to connect to external voice processing resources, some systems use a Resource Bus Interface (RBI) card that is plugged into the system buses for communications with the various ports. The RBI card is connected to one or more external resources by means of a conventional voice processing resource bus. The card communicates with the line card ports by way of the CPU/matrix card. It thus requires four time slots on the system bus for each call that uses its resources. This ties up line card ports that would otherwise be used for processing calls and reduces the call-handling capacity of the switch.

As described in U.S. Pat. No. 5,544,163, an expandable system comprises a plurality of switching nodes interconnected over an internodal bus. A call between ports on different nodes is routed over the system buses on the two nodes and the internodal bus. A system resource may have more capacity than is needed for one switching node and it would therefore be desirable to make the resource available to the other nodes in the system.

SUMMARY OF THE INVENTION

In the present invention a telecommunications switching node includes at least one resource interface card which serves as an interface for connection to external call processing resources. The interface card communicates with the line cards in the switching node directly over the system buses, i.e. without passing through the CPU\matrix card and it uses two line card ports to connect to all external resources. The resource interface card also communicates with line cards that are connected to the system buses in other switching nodes in an expanded switching network. Its resources are thus available to ports in the other nodes when those nodes have available ports that are not occupied with other tasks. For communications with the latter ports, the resource interface card transmits information through the CPU/matrix cards on its switching node and on the nodes where the communicating ports reside. Thus for communications with ports on its switching node, the interface card receives information on the incoming bus and transmits it on the outgoing bus and for communications with ports on other nodes it receives information on the outgoing bus and transmits it on the incoming bus.

In the preferred embodiment of the invention, the incoming data from ports in the same switching node as the interface card or from other nodes in the system enter the resource through either the incoming bus or the outgoing bus and it is stored in a memory in the resource interface card. A memory address is read from a transmit connection map, i.e., a lookup table of memory addresses. Data in the memory location identified by that address is then transmitted to an external resource over a resource bus. Once the data is processed by the external resource, information is sent back to the resource interface card for transmission to the appropriate port. The information is stored in a second address in the resource card's memory. That address is ultimately selected from a receive map and the data in the memory location identified by that address is transmitted on a time slot basis to either the incoming bus or the outgoing bus, depending on whether the receiving port is in the same switching node as the interface card or in another node.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
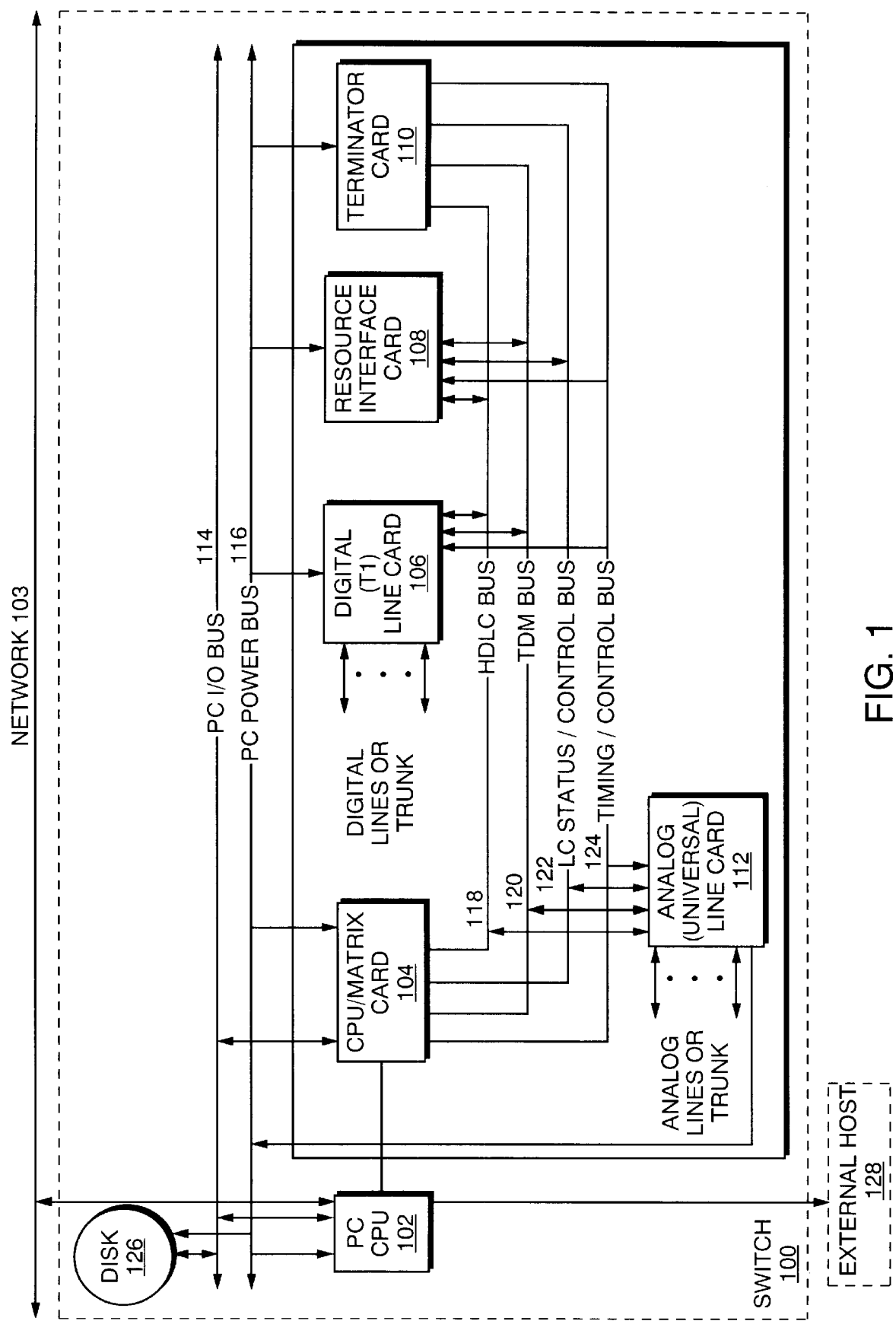
FIG. 1 is a block diagram of a telecommunications switch which resides in a computer and which includes a resource interface card constructed in accordance with the preferred embodiment of the present invention.

FIG. 1 is a block diagram of a switch. The switch 100 includes a central processing unit (CPU) 102 and a hard disk drive 126 that are interconnected by an input/output (I/O) bus 114. The switch 100 also includes a power bus 114 and a chassis or housing in which a motherboard is mounted along with the disk drive 126 and other optional accessories. The CPU 102 is mounted on the motherboard, which includes a series of slots into which other boards (cards) may be inserted and thereby connected to the I/O bus 114 and/or power 116 bus.

A CPU/matrix card 104 is interconnected with digital line cards 106, a resource interface card 108, a terminator card 110 and analog line cards 112 by four buses: a high speed data link control (HDLC) bus 118, time division multiplexing (TDM) buses 120, a line card (LC) status/control bus 122, and a timing/control bus 124. The CPU/matrix card 104 and the CPU 102 communicate with each other through the I/O bus 114. The line cards 106, 112 and the resource interface card 108 are connected to receive their basic operating power from the power bus 114. An external host 128, which comprises a separate computer, may be linked with the CPU/matrix card 104 for supervisory control over the switch.

Figure 2:
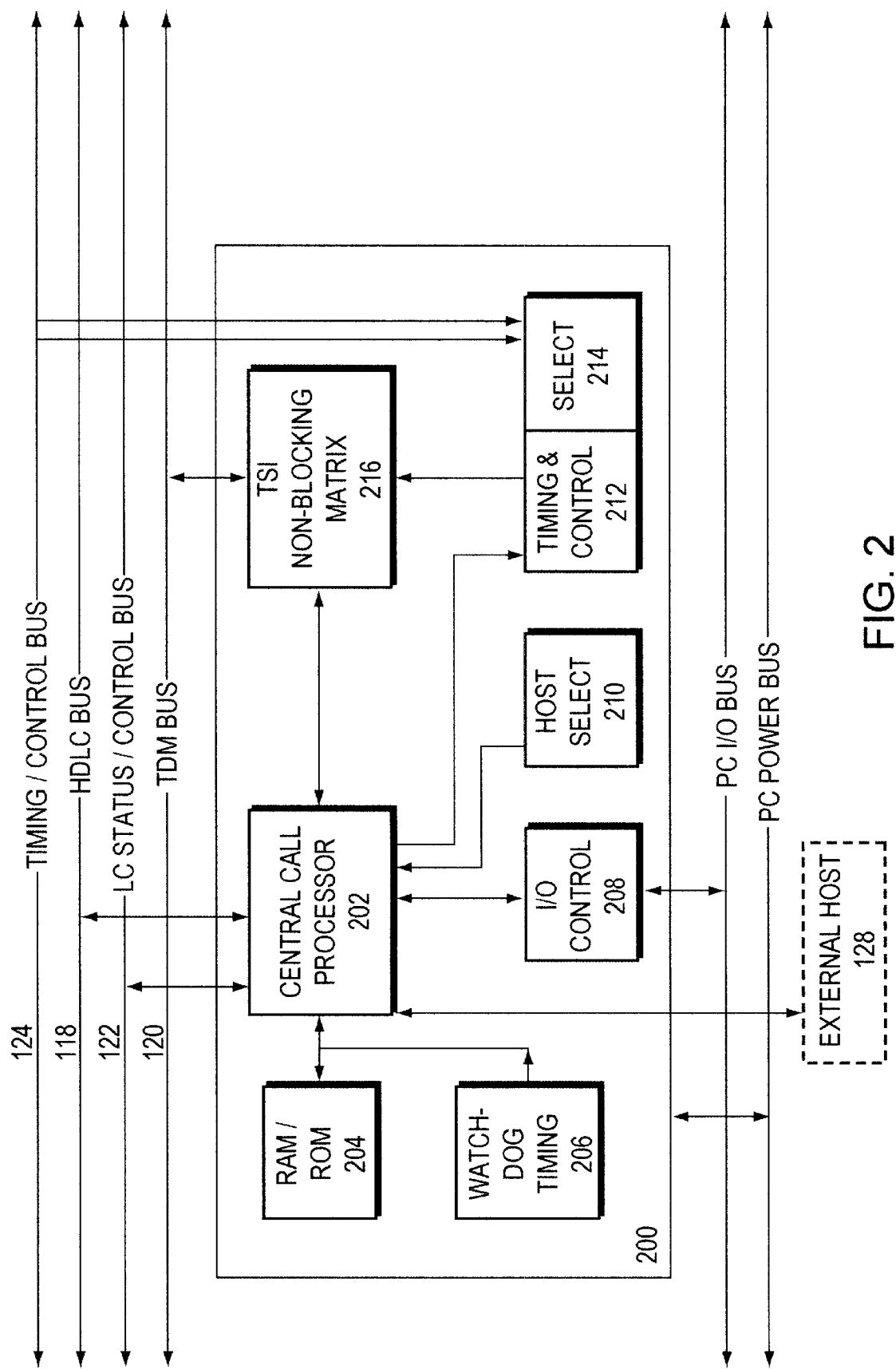
FIG. 2 is a detailed diagram of a CPU/matrix card of FIG. 1.

FIG. 2 shows the CPU/matrix card 200 in greater detail. The card 200 includes a central call processor 202 which has control over all other circuitry on the CPU/matrix card It is connected to the HDLC bus 118, the LC status/control bus 112, host select circuitry 210, random access(RAM) and read only memories 204, watchdog timing circuitry 206, I/O control circuitry 208, timing and control/select circuitry 212 and time slot interchange (TSI) 216. The central call processor 202 uses the HDLC bus 118 to simultaneously transmit messages to all cards connected to that bus or it may use the LC status/control bus 122 to assign time slots to other the cards that transmit and receive messages to over the TDM buses 120. Host select circuitry 210, connected to the CPU/matrix card's call processor 202, is a switch which informs the central call processor whether to communicate with the internal host (CPU 120) or the external host 128. The I/O control circuitry 208 manages communications between the central call processor 202 and the internal host. The timing and control/select circuitry 212 responds to instructions from the central call processor 202 to provide synchronizing signals for the CPU/matrix card and the other cards on the switch. The TSI 216 receives and transmits data through the TDM buses 120 and operates as directed by the central call processor 202 to interchange time slots in a conventional manner.

Figure 3:
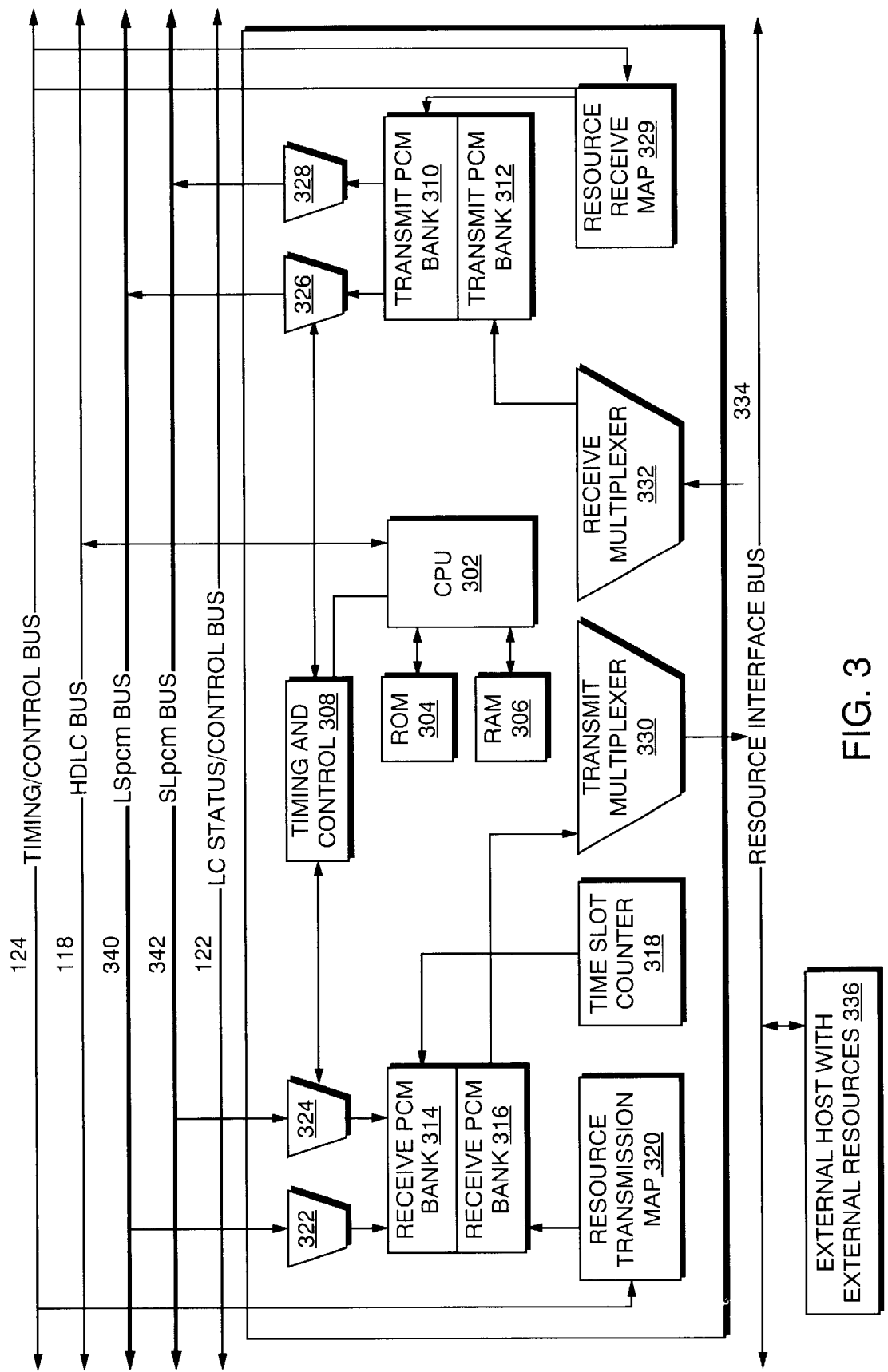
FIG. 3 is a detailed diagram of a resource interface card of FIG. 1.

FIG. 3 shows in greater detail the resource interface card 300 of FIG. 1. The various buses described are shown as duplicated for the purpose of providing redundancy. The TDM buses 120 comprise two communication paths designated as "I,Spcm" 340 and "SLpcm" 342. The LSpcm 340 path carries pulse code modulation (PCM) data from the line cards 106, 112 to the CPU/matrix card 200 and the resource interface card 300. The SLpcm 342 path carries PCM data from the CPU/matrix card 200 and resource interface card 300 to the line cards 106, 112.

A CPU 302 on the resource interface card 300 has overall control of the other components and modules on the card. It is connected to the HDLC bus 118, a read only memory (ROM) 304, a random access memory (RAM) 306 and timing and control circuitry 308. The CPU 302 communicates with the central call processor 202 on the CPU/matrix card 200 via the HDLC bus 118. The CPU 302 receives card 200 instruction to perform certain actions and it transmits messages to the card 200 when the requested actions have been performed. Communications over the TDM buses 120 are synchronized with the CPU/matrix card 200 through timing signals received by the timing/control bus 124.

Receive PCM banks 314, 316 are connected to continuously receive all PCM data transmitted from the SLpcm bus 342 or from the LSpcm bus 340. There is a one to one relationship between the Receive PCM Banks 314 and 316. Incoming multiplexers 322, 324 pass PCM data from the TDM buses 340, 342 to the Receive PCM Bank 314. A time slot counter 318 is connected to Receive PCM Bank 314 in order to address the memory locations for receiving PCM data over the TDM buses 340, 342.

A resource transmission map 320 which is a lookup table, is connected to Receive PCM Bank 2 316. The transmission map 320 generates addresses in the Receive PCM Bank 316 and data in the location identified by a generated address is read from the Receive PCM Bank 316. The data is transmitted to a transmit multiplexer 330 where it is formatted for transmission to external resources. The transmit multiplexer 330 then passes the PCM data to an external resource 336 through a resource bus 334. The resource interface multiplexers 330, 332 connect the resource interface card to any industry standard interface bus which is connected to external resources 336.

When information is received from the external resource 336, it is transmitted through a receive multiplexer 332 to a Transmit PCM Bank 312. There is a one to one relationship between the Transmit PCM Bank 310 and the Transmit PCM Bank 312. A resource receive map 329 which is a lookup table, is connected to Transmit PCM Bank 310. An address in the Transmit PCM Bank 312 is generated by the resource receive map 329. Data in a location in the Transmit PCM Bank 310 identified by that address is transmitted through time slots on the TDM buses 340 and 342 to the appropriate port. During any given time slot, only one of the CPU/matrix card 200 and the resource interface card 300 is permitted to transmit PCM data over the TDM buses 340 to the line cards.

Figure 4:
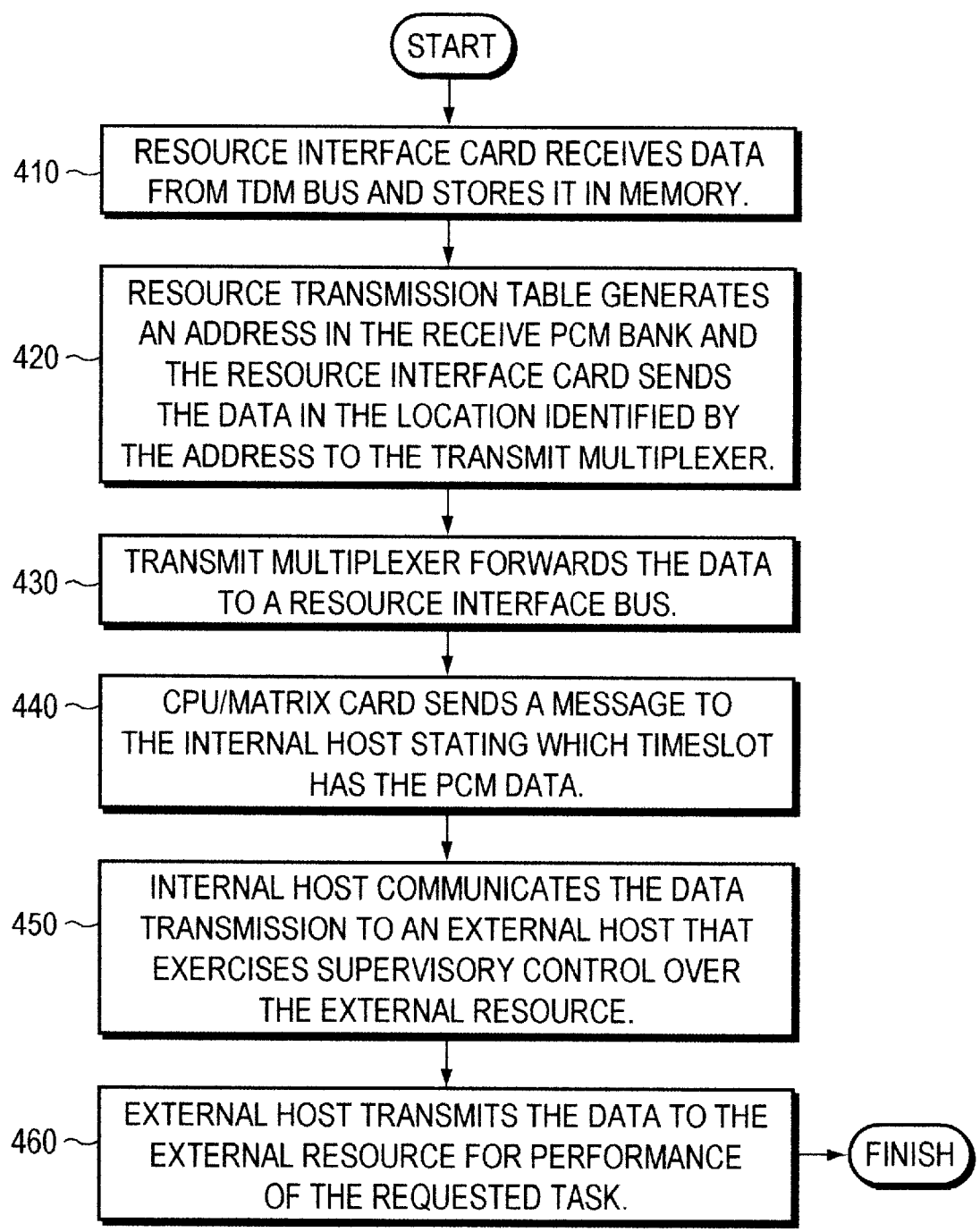
FIG. 4 is a flow diagram showing the tasks performed when the resource interface card processes an incoming call.

FIG. 4 is a flow diagram showing the tasks performed when the resource interface card processes an incoming call. In Step 410, at any given time slot, the resource interface card 300 may receive PCM data from either the SLpcm bus 342 or from the LSpcm bus 340. The PCM data is stored in (written to) a memory location in Receive PCM Bank1 314. In Step 420, the transmit map 320 selects an address corresponding to a location in the Receive PCM Bank 2 316. During the same time slot, the resource interface card 300 transmits the PCM data stored in the memory location corresponding to that address to the transmit resource interface multiplexer 330. In Step 430, the transmit resource interface multiplexer 330 forwards the data to a standard resource interface bus 334 that is connected to the resource interface card 300. In Step 440, the CPU/matrix card 200 on switch 100 sends a message to the internal host 102, informing the host which time slot is transmitting the PCM data. In order for the external resource to know what to do with the data, the internal host communicates with the external host 128 that exercise supervisory control over the external resource in Step 450. In Step 460, the external host transmits the data to the external resource device for performance of the requested task.

Figure 5:
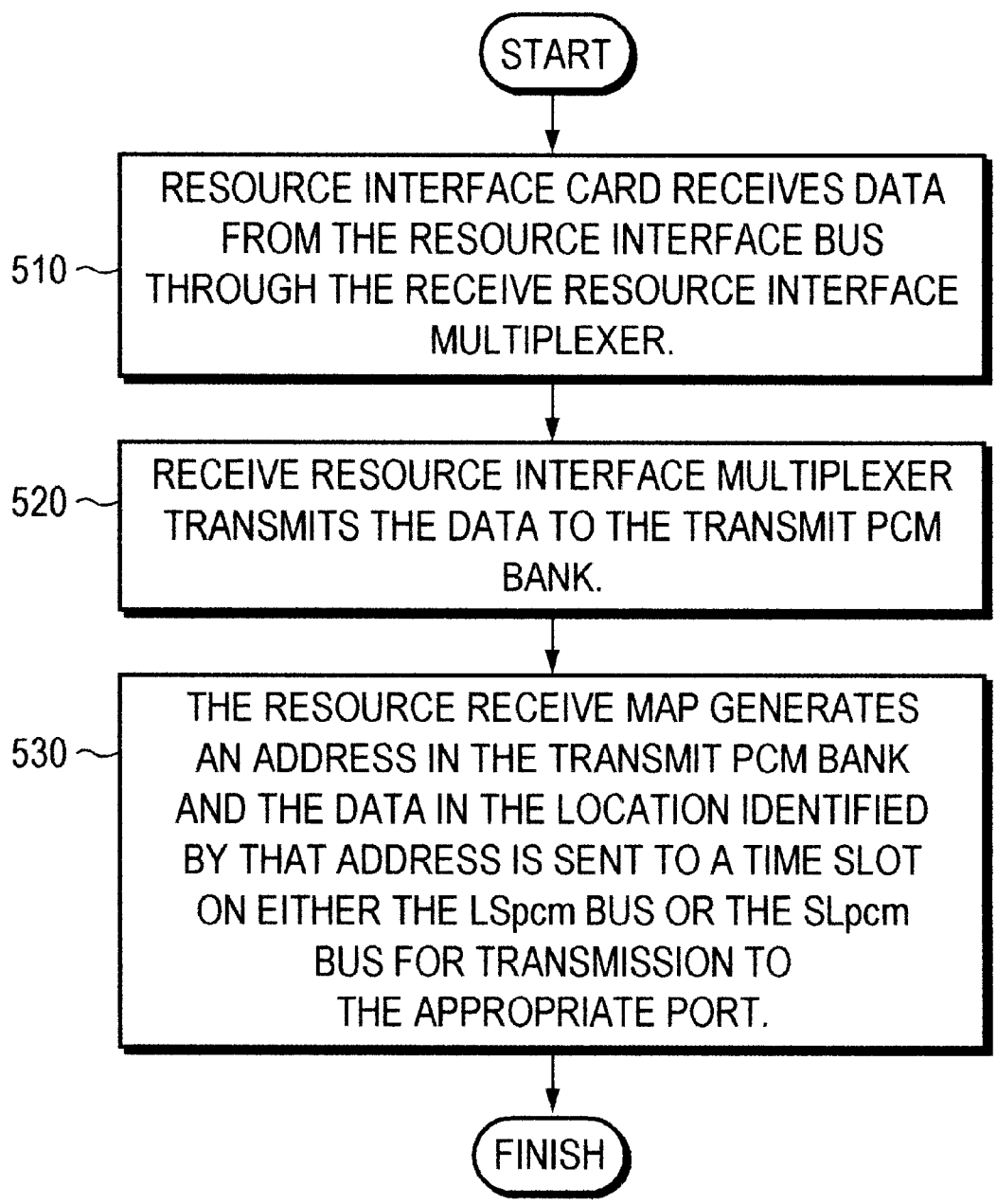
FIG. 5 is a flow diagram showing the tasks perfumed when the resource interface card processes an outgoing call.

FIG. 5 is a flow diagram showing how a call is processed after being operated on by an external resource. In Step 510, at any given time slot, the resource interface card 300 receives data from the resource interface bus 334 through the receive resource interface multiplexer 332. In Step 520, the resource interface multiplexer 332 transmits the data to the Transmit PCM Bank 1 312. In Step 530 an address in the Transmit PCM Bank 2 310 is randomly read from the receive map and the PCM data in the corresponding location in the Transmit PCM Bank 2 310 is read. During the same time slot, the PCM data is transmitted to the port assigned to the time slot either through the LSpcm bus 340 or through the SLpcm bus 342.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A communications network comprising:
    A) a plurality of switching nodes each of which contains line cards with multiple ports for connections between the communications network and subscriber lines or other switching systems, each of said nodes including
        1. a switch,
        2 an incoming bus for transferring switched data from the line cards to the switch, and
        3. an outgoing bus for transferring switched data from the switch to the line card;
    B) an internal network interconnecting the switching nodes for conveying switched telecommunications data between them;
    C) at least one node including a resource interface card that connects the node to external resources, the resource interface card including,
        1. means for transmitting data to line cards on the same node over the outgoing bus and receiving data from those line cards over the incoming bus, and
        2. means for transmitting data to line cards on other nodes over the incoming bus and the switch and receiving data from those line cards over the switch and the outgoing bus;
    D) means in each switching node for forwarding incoming information from ports to external resources for processing; and
    E) means for returning processed information from external resources to the requesting port through the incoming or outgoing bus.

2. The communications network of claim 1 wherein the resource interface card comprises:
    A) a memory for storing incoming data from the ports and external resources;
    B) at least one table for storing memory addresses;
    C) a resource bus for transmitting information from the memory to external resources; and
    D) means for selecting addresss from the table and retrieving data in the memory location identified by that address.

3. The communications network of claim 2 wherein the resource interface card further comprises:
    A) a processor for providing overall control of components on the resource interface card and for communicating with the switch via a system bus;
    B) timing and control circuitry for synchronizing communications on the incoming and outgoing buses between the resource interface card and the switch;
    C) a time slot counter connected to memory locations for addresssing the memory locations.

4. The communications network of claim 3 wherein the incoming and outgoing buses are time division multiplexed with time slots in these buses assigned to ports, the resource interface card connected to these buses:
    A) communicates with the ports on the same node on a time slot basis directly over the incoming or outgoing bus, without passing through the switch; and
    B) utilizes time slots on each bus to transmit data bi-directionally between the port and external resources connected to the node.

5. The communications network of claim 4 wherein during one time slot only one of the switch and the resource interface card is permitted to transmit data over the incoming and outgoing buses to the line cards.

6. The communications network of claim 5 wherein means for transmitting incoming data from the ports comprises:
    A) means for receiving data from the ports on the same node or other nodes and storing the data in the memory;
    B) means for obtaining a memory address from a transmit connection table;
    C) means for transmitting data in the memory location identified by the address over the resource bus to an external resource for processing;
    D) means in the switch for informing an internal host which time slot has the data;
    E) means for communicating between the internal host and an external host which exercises supervisory control over the external resource; and
    F) means in the external host for transmitting the data to the external resources for performance of the required task.

7. The communications network of claim 6 wherein means for receiving processed data comprises:
    A) means for receiving processed data from external resources connected to the node and storing the data in the resource interface unit's memory;
    B) means for obtaining a memory address from a receive table; and
    C) means for transmitting data in the memory location identified by that address on a time slot basis to either the incoming bus or outgoing bus depending on whether the receiving port is in the same node or another node.

8. A switching node comprising:
    A) line cards with multiple ports for connections between the switching node and subscriber lines or other switching systems;
    B) a switch for switching data from one port to another;
    C) an incoming bus for transferring switched data from the line cards to the switch,
    D) an outgoing bus for transferring switched data from the switch to the line card;
    E) a resource interface card that connects the node to external resources, the resource interface card including, 1. means for transmitting data to line cards on the same node over the outgoing bus and receiving data from those line cards over the incoming bus, and 2. means for transmitting data to line cards on other nodes over the incoming bus and the switch and receiving data from those line cards over the switch and the outgoing bus;

F) means for forwarding incoming information from ports to external resources for processing; and G) means for returning processed information from external resources to the requesting port through the incoming or outgoing bus.

9. The switching node of claim 8 wherein the resource interface card comprises:

A) a memory for storing incoming data from the ports and external resources;

B) at least one table for storing memory addresses;

C) a resource bus for transmitting information from the memory to external resources; and D) means for selecting addresss from the table and retrieving data in the memory location identified by that address.

10. The switching node of claim 9 wherein the resource interface card further comprises:

A) a processor for providing overall control over components on the resource interface card and for communicating with the switch via a system bus;

B) timing and control circuitry for synchronizing communications on the incoming and outgoing buses between the resource interface card and the switch;

C) a time slot counter corrected to memory locations for addresssing the memory locations.

11. The switching node of claim 10 wherein the incoming and outgoing buses are time division multiplexed with time slots in these buses assigned to ports, the resource interface card connected to these buses:

A) communicates with the ports on the same node on a time slot basis directly over the incoming or outgoing bus, without passing through the switch; and B) utilizes time slots on each bus to transmit data bi-directionally between the port and external resources connected to the node.

12. The switching node of claim 11 wherein during one time slot only one of the switch and the resource interface card is permitted to transmit data over the incoming and outgoing buses to the line cards.

13. The switching node of claim 12 wherein means for transmitting incoming data from the ports comprises:

A) means for receiving data from the ports on the same node or other nodes and storing the data in the memory;

B) means for obtaining a memory address from a transmit connection table;

C) means for transmitting data in the memory location identified by the address over the resource bus to an external resource for processing;

D) means in the switch for informing an internal host which time slot has the data;

E) means for communicating between the internal host and an external host which exercises supervisory control over the external resources; and F) means in the external host for transmitting the data to the external resources for performance of the required task.

14. The switching node of claim 13 wherein means for receiving processed data comprises:

A) means for receiving processed data from external resources connected to the node and storing the data in the resource interface unit's memory;

B) means for obtaining a memory address from a receive table; and

C) means for transmitting data in the memory location identified by that address on a time slot basis to either the incoming bus or outgoing bus depending on whether the receiving port is in the same node or another node.

15. A method for exchanging data between ports in a switching node and external resources, the switching node including line cards with multiple ports for connections between the switching node and subscriber lines or other switching systems, a switch for switching data from one port to another, an incoming bus for transferring switched data from the line cards to the switch, an outgoing bus for transferring switched data from the switch to the line card, a resource interface card that connects the node to external resources, the resource interface card, said method comprising the steps of:

A) receiving data in the resource interface card on either the incoming bus or the outgoing bus;

B) storing the data in a memory location;

C) selecting a memory address from a transmit table;

D) transmitting the data identified by the selected address over a resources interface bus that is connected to the resource interface card to external resources for processing;

E) returning the data from the external resources to the resource interface card and storing the data in a receive memory location;

F) randoming reading a memory address from a receive table;

G) sending data in the read memory address on the incoming bus or the out going bus to a port assigned a time slot either bus.

16. The method of claim 15 wherein the step of transmitting further comprises the steps of:

A) informing an internal host which time slot has the data;

B) communicating between the internal host and an external host which exercises supervisory control over the external resources; and C) transmitting the data to the external resources by the external host for performance of the required task.

* * * * *